US007449530B2

(12) United States Patent
Hagerty et al.

(10) Patent No.: US 7,449,530 B2
(45) Date of Patent: Nov. 11, 2008

(54) POLYMERIZATION PROCESS

(75) Inventors: Robert O. Hagerty, La Porte, TX (US); Randall B. Laird, Pasadena, TX (US); Michael A. Risch, Seabrook, TX (US); Pradeep P. Shirodkar, Stow, OH (US); Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 62 days.

(21) Appl. No.: 11/629,369

(22) PCT Filed: Jun. 20, 2005

(86) PCT No.: PCT/US2005/021732

§ 371 (c)(1),
(2), (4) Date: Dec. 12, 2006

(87) PCT Pub. No.: WO2006/028549

PCT Pub. Date: Mar. 16, 2006

(65) Prior Publication Data
US 2007/0255017 A1   Nov. 1, 2007

Related U.S. Application Data

(60) Provisional application No. 60/581,521, filed on Jun. 21, 2004.

(51) Int. Cl.
C08F 2/14 (2006.01)
C08F 6/24 (2006.01)
C08F 210/06 (2006.01)
(52) U.S. Cl. ......................... 526/206; 526/64; 526/912; 528/501
(58) Field of Classification Search .................. 526/64, 526/74, 206, 912; 528/501
See application file for complete search history.

(56) References Cited

U.S. PATENT DOCUMENTS

| 3,056,771 A | 10/1962 | Aldridge et al. |
| 3,470,143 A | 9/1969 | Schrage et al. |
| 5,624,878 A | 4/1997 | Devore et al. |
| 5,780,565 A | 7/1998 | Clough et al. |
| 6,534,613 B2 | 3/2003 | Ford et al. |
| 2003/0100688 A1 | 5/2003 | Farrer et al. |
| 2003/0199645 A1 | 10/2003 | Kendrick et al. |

FOREIGN PATENT DOCUMENTS

| CA | 2193483 | * | 1/1996 |
| EP | 1 323 746 | | 7/2003 |
| JP | 61007301 | | 1/1986 |
| WO | WO96/33227 | | 10/1996 |
| WO | WO00/58374 | | 10/2000 |
| WO | WO2004/026921 | | 4/2004 |
| WO | WO2005/113610 | | 12/2005 |
| WO | WO2005/113615 | | 12/2005 |
| WO | WO2006/002132 | | 1/2006 |
| WO | WO2006/009942 | | 1/2006 |
| WO | WO2006/009944 | | 1/2006 |
| WO | WO2006/009945 | | 1/2006 |
| WO | WO2006/009949 | | 1/2006 |
| WO | WO2006/009951 | | 1/2006 |
| WO | WO2006/009976 | | 1/2006 |
| WO | WO2006/009977 | | 1/2006 |
| WO | WO2006/009979 | | 1/2006 |
| WO | WO2006/009980 | | 1/2006 |
| WO | WO2006/009981 | | 1/2006 |
| WO | WO2006009946 | | 1/2006 |
| WO | WO2006/019494 | | 2/2006 |
| WO | WO2006/025917 | | 3/2006 |
| WO | WO2006/028549 | | 3/2006 |
| WO | WO2006/083303 | | 8/2006 |

OTHER PUBLICATIONS

U.S. Appl. No. 11/285,264, filed Nov. 22, 2005, Iaccino et al.

* cited by examiner

Primary Examiner—Fred M Teskin
(74) Attorney, Agent, or Firm—Catherine Bell; Frank Reid

(57) ABSTRACT

This invention is directed to processes of making polymer in the presence of a fluorinated hydrocarbon and recovering the polymer. The processes provided enable polymerization processes to be practiced with minimal fouling in the reaction system, and allows for the recovery of the fluorinated hydrocarbon and other hydrocarbons such as hydrocarbons for re-use in the process or hydrocarbon by-products from the polymerization process. The invention is particularly beneficial in the production of propylene-ethylene based copolymers using Ziegler-Natta catalyst systems.

52 Claims, No Drawings

POLYMERIZATION PROCESS

CROSS REFERENCE TO RELATED APPLICATIONS

This application claims the benefit of Provisional Application No. 60/581,521 filed Jun. 21, 2004, the disclosure of which is fully incorporated herein by reference.

This application is the national phase entry into the United States Patent Office of international application number PCT/US2005/02 1732 filed Jun. 20, 2005, which claims benefit of and priority to U.S. Provisional Patent Application Ser. No. 60/581,521 filed Jun. 21, 2004.

FIELD OF THE INVENTION

This invention is directed to a process for producing copolymer using a diluent containing at least one fluorinated hydrocarbon. In particular, this invention is directed to a process for producing a propylene type copolymer in the presence of a diluent containing at least one fluorinated hydrocarbon and using a Ziegler-Natta type catalyst.

BACKGROUND OF THE INVENTION

Elastomers such as ethylene-propylene copolymer (EPM) and ethylene-propylene-diene (EPDM) are commercially produced by three different processes: the solution process, the suspension process (also known as the slurry process), and the gas-phase process using Ziegler-Natta catalyst systems based on transition metals.

In a solution process, the polymer formed is dissolved in the polymerization medium. The higher the concentration of the polymer, the higher the viscosity of the polymerization reaction mixture containing polymer, monomers and solvent. High viscosity in the polymerization reactor associated with solution process is a limiting step for process efficiency and polymer production. High viscosity can also lead to the difficulty for efficient mixing in the reactor to maintain a homogeneous system and avoid product property drift (heterogeneity), reactor safety, process control problems. This is especially true to process with molecular weight polymers. Higher operating temperature reduces the viscosity. However, the molecular weight of the polymer tends to decrease with reaction temperature. Thus production of higher molecular weight polymers in solution processes is generally limited by the viscosity of the polymerization medium.

Polymers with low crystallinity or amorphous character as well as those with higher crystallinities are currently produced in slurry and suspension processes using hydrocarbon solvents as diluents. The suspension process can advantageously handle polymer concentrations in the reactor up to 25-30 weight %, as compared to 7-18 weight % in the solution process which are limited by solution viscosity at a high level of solids content. These higher concentrations are attributable to the characteristics of decreasing polymer-polymer entanglements in the suspension process by forcing the entangled polymer into the dispersed suspended phase thereby decreasing the concentration of entangled polymer in the bulk reactor solution phase. The recovery of polymer is also simpler in the slurry process. However, it is necessary that the solid particles in the slurry process do not agglomerate to one another or adhere to the surfaces of the reactor wall and the transport lines. Extremely low operating temperatures are adopted reduce the soluble fraction of polymer in the solvent. Mitigation of polymer fouling is a challenging task.

High monomer content polymer inherently has low melting or softening temperature. Under such conditions in either a fluidized or stirred gas-solid phase reactor, stickiness of the olefin polymer particles or granules becomes a problem. Ethylene copolymers using propylene, butene-1, and higher alpha comonomers are prone to stickiness problems when their crystallinity is below 30%. The stickiness problem becomes even more critical with copolymers of ethylene and propylene having a crystalline content less than 10%. In the gas-phase process, polymerization is carried out in the presence of a Ziegler-Natta catalyst, which can either be charged as a prepolymerized catalyst system or can be non-prepolymerized. In the latter case, using a fluidization aid, such as carbon black, talc or silica, is necessary to maintain stable fluidization and to avoid agglomeration of polymer particles and sheeting on the reactor walls. Using carbon black limits the production to black elastomer product.

Many polymers are insoluble in the reaction medium from which they are formed. Upon significant polymerization, polymer chains reach a crystallizable length and polymer nucleation and crystallization begins. The crystallization of polymers leads to polymer-solvent phase separation. On the other hand, polymer-solvent phase separation can be also induced through change of solvency of the reaction medium with respect to polymer. Swell and stickiness of the separated polymers can be improved through change of the affinity between the polymer and reaction medium. The instant invention provides a polymerization process which efficiently produces polymer with reduced operation difficulties and/or reduced reactor fouling. This is achieved through proper selection of diluent in reaction medium.

Processes initially used for the manufacture of polypropylene were based on the use of a hydrocarbon diluent to suspend crystalline polymer particles formed in the process and dissolve the amorphous polymer fraction. Residual catalyst components were deactivated and solubilized by treatment with alcohol, and the deactivated catalyst separated from the diluent by treatment with water. The crystalline polymer product was separated from the diluent by filtration or centrifugation and then dried. The amorphous polymer, which was soluble in the diluent, was separated by evaporation.

What has been referred to as fourth generation polymerization catalysts in *Polypropylene Handbook*, Edward P. Moore, Jr., Ed., Hanser Publishers, 1996, have led to processes that do not require the use of diluents in the polymerization process by using either liquid or gaseous monomer as the polymerization medium. However, flexibility of types of catalysts used in non-diluent systems is somewhat limited and higher quality propylene feed is generally required.

The stickiness of polymer can be mitigated through reducing the granule swell and improved particle morphology. An example of a polymerization process that incorporates the use of a nonreactive diluent is shown in U.S. Pat. No. 3,470,143 (Schrage et al.). Specifically, the Schrage patent discloses the use of a fluorinated organic carbon compound as a diluent in polymerizing at least one ethylenically unsaturated hydrocarbon monomer to form an amorphous elastomer. The product can be dried in the form of small particles.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature.

U.S. Pat. No. 5,624,878 discloses the polymerization using "constrained geometry metal complexes" of titanium and zirconium.

Adhesion of polymers to reactor walls in slurry polymerization processes is and has been a known problem. Japanese Kokai Patent Application SHO 61[1986]-7301 indicates that a prior method of reducing this adhesion or fouling problem was to keep the slurry concentration at a relatively low level. However, such a process would have to be run at a relatively low polymer productivity. A further method of reducing polymer adhesion that is also described in the '7301 Kokai is to use a certain concentration of fluorocarbons in the polymerization system. The amount of fluorocarbon used in the system is generally limited from 0.01-5weight %. Below this amount, the use of the fluorocarbon is said to be ineffective and above this amount is reported to result in lower polymerization activity.

There remains a need to increase polymer product quality and process efficiency, particularly processes that reduce slurry polymerization fouling without suffering any substantial loss in polymerization activity. It is particularly desirable to find polymerization processes that use propylene as at least one monomer feed component, and to produce a polypropylene copolymer type product that can be recovered in particle form. Such a process would also be desirable in the production of propylene-ethylene type polymers that have significant amounts of ethylene incorporated into the copolymer. Processes that provide for higher flexibility in types of catalyst that can be used, as well as provide copolymers that are very low in crystallinity, whether at low or high amounts of ethylene incorporation, are especially preferred. In addition, processes that provide for the use of diluents are also preferred in that such processes would generally provide an increase in comonomer (e.g., ethylene) content at a lower comonomer partial pressure.

SUMMARY OF THE INVENTION

The invention provides a process for making a polymer product at relatively high catalytic productivity and with very low reactor fouling during the reaction process. The invention incorporates the use of a fluorinated hydrocarbon compound, and provides a wide variety of propylene-ethylene copolymer products.

According to one aspect of the invention, there is provided a process for producing polypropylene copolymer. The process comprises mixing together a diluent containing at least one fluorinated hydrocarbon, a Ziegler-Natta catalyst system, and an olefin feed. The copolymer is formed and then recovered for use. Preferably, the olefin feed contains at least 25 weight % propylene and greater than 10 weight % ethylene, based on total weight of the feed.

In one embodiment, the fluorinated hydrocarbon is represented by the formula: $C_xH_yF_z$ wherein x is an integer from 1 to 40, wherein y is greater than or equal to 0 and z is an integer and at least one, preferably x is from 1 to 6, and y and z are integers and at least one. The diluent can further comprise, in one embodiment, at least one $C_1$ to $C_{40}$ alkane, and in another embodiment, the fluorinated hydrocarbon is a perfluorinated hydrocarbon.

In another embodiment, the olefin feed contains less than 90 weight % propylene, based on total weight of the olefin feed. In a particular embodiment, the olefin feed contains from 25 weight % to less than 90 weight % propylene, or from 40 weight % to less than 90 weight % propylene, or from 50 weight % to less than 90 weight % propylene, based on total weight of the olefin feed.

In another embodiment of the invention, the olefin feed contains less than 75 weight % ethylene, or less than 60 weight % ethylene, or less than 50 weight % ethylene, or less than 25 weight % ethylene, or less than 15 weight % ethylene, based on total weight of the olefin feed.

A copolymer can also be produced by mixing olefin feed, wherein the olefin feed contains at least 20 weight % ethylene, based on total weight of the olefin feed. In another embodiment, the olefin feed contains greater than 10 weight % and less than 75 weight % ethylene, or from 15 weight % to 60 weight % ethylene, or from 15 weight % to 50 weight % ethylene, or from 15 weight % to 40 weight % ethylene, based on total weight of the olefin feed.

In yet another embodiment, the olefin feed further contains one or more comonomers having olefinic unsaturation and are capable of insertion polymerization. Alternatively, the olefin feed contains one or more comonomers selected from linear, branched, or ring-containing olefins having up to 30 carbon atoms, and combinations thereof. Still alternatively, the olefin feed contains one or more comonomers selected from linear or branched $C_4$ to $C_{20}$ alpha olefins.

The process of the invention can be carried out in a loop reactor or a stirred tank reactor. In one embodiment, a slurry is continuously discharged from the reactor as polymerization effluent. Typically, the polymerization effluent is flashed in a first flash to vaporize from about 50% to about 100% of liquid in the effluent to produce concentrated polymer effluent and vaporized liquid.

In any of the embodiments described herein the materials stripped or flashed off may be passed through activated carbon to remove all or part of the fluorinated hydrocarbon.

Other embodiments of the invention are defined by any two or more of the above limitations in combination.

DETAILED DESCRIPTION OF THE INVENTION

I. Introduction

This invention is directed to a process for producing polymer, preferably polypropylene copolymer, that is carried out at relatively high productivity levels and with relatively low fouling. According to this invention a polypropylene copolymer is a polymer that is manufactured from at least two monomers, with at least one of the monomers being propylene. The amount of propylene contained in the copolymer can vary according to the type of polymer desired.

Preferred types of polypropylene copolymers that can be manufactured according to this invention incorporate a wide range of ethylene as a preferred comonomer, with the polymer product being very low in crystallinity. The polymers made according to this invention can be recovered in particle form, since the process incorporates the use of a preferred fluorinated hydrocarbon diluent. The particle forming process can be further enhanced by producing the polymer at low temperature or using an additional prepolymerization step. The fluorinated hydrocarbon diluent used in the process of the invention provides the added advantage that there is no significant loss in polymerization activity, particularly in a slurry form process, as well as provides for an increase in ethylene content at a lower ethylene partial pressure.

The process of the invention includes mixing together a diluent, a catalyst system and olefin feed to make the desired copolymer. Preferably the diluent contains at least one fluorinated hydrocarbon. The catalyst is preferably a Ziegler-Natta catalyst system, and the olefin feed preferably contains at least 25 weight % propylene and greater than 10 weight % ethylene, based on total weight of the feed. The mixture of diluent, catalyst and feed is conducted to form a slurry, with polymer being formed in the slurry. The polymer is then recovered from the slurry, while any unreacted or unused materials from the process can be recovered and re-used or discarded as desired.

II. Diluent

The diluent used in this invention is beneficial in producing highly useful polymer products. Use of the diluent can also provide polymer processes having reduced fouling, higher overall efficiencies and/or reduced environmental emissions. The diluent of the invention is preferably one or more compositions added to the reaction process that reduces the concentration of one or more active materials in the process to achieve the desired and beneficial effect. Preferably, the diluent composition is a hydrocarbon having little to no solvent power to polymer produced. More preferably, the diluent contains a halogen containing, most preferably fluorinated hydrocarbon compound, and the diluent preferably has little to no solvent power with respect to the polymer product. The fluorinated hydrocarbon components can be used individually or as mixtures, and can be included in a mixture with non-fluorinated hydrocarbon compounds if desired.

According to this invention, the term fluorinated hydrocarbon is interchangeably referred to as hydrofluorocarbon or hydrofluorocarbon compound or HFC. The fluorinated hydrocarbon compounds have at least one carbon atom and at least one fluorine atom. The fluorinated hydrocarbon can be a perfluorinated hydrocarbon or the fluorinated hydrocarbon can optionally include one or more hydrogen atom(s). A perfluorinated hydrocarbon is a fluorocarbon in which the hydrogen directly attached to the carbon atom(s) is completely replaced by fluorine. See Hawley's Condensed Chemical Dictionary, Thirteenth Edition, Van Nostrand Renhold, 1997. Examples of preferred perfluorocarbons include linear branched or cyclic, $C_1$ to $C_{40}$ perfluoroalkanes.

In one embodiment, the fluorinated hydrocarbons are represented by the formula:

$$C_xH_yF_z$$

wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal to 0 and z is an integer and at least one, more preferably, y and z are integers and at least one. In a preferred embodiment, z is 2 or more.

In one embodiment, a mixture of fluorinated hydrocarbons is used in the process of the invention, preferably a mixture of a perfluorinated hydrocarbon and a fluorinated hydrocarbon, and more preferably a mixture of a fluorinated hydrocarbon. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1, 1,2,4-pentafluorobutane; 1,1,1,3,3-pentafluorobutane; 1,1,1,3,4-pentafluorobutane; 1,1,1,4,4-pentafluorobutane; 1, 1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1, 1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1, 1, 1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1, 1,2,3,3,4,4-octafluorobutane; 1,1,1,2,2,4,4,4-octafluorobutane; 1,1,1,2,3,4,4,4-octafluorobutane; 1,1,1,2, 2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. In addition to those fluorinated hydrocarbons described herein, those fluorinated hydrocarbons described in Raymond Will, et. al., CEH Marketing Report, *Fluorocarbons*, Pages 1- 133, by the Chemical Economics Handbook-SRI International, April 2001, which is fully incorporated herein by reference, are included.

In another embodiment, the fluorocarbon is not a perfluorinated $C_4$ to $C_{10}$ alkane. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, or perfluorotoluene.

In one embodiment, commercially available fluorinated hydrocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55volume %, preferably greater than 60 volume %, preferably greater than 65 volume %.

In another embodiment the fluorocarbon is a blend of hydrofluorocarbon and perfluorocarbon, and preferably the hydrofluorocarbon is present at more than 1 volume %, based upon the total volume of the hydrofluorocarbon and perfluorocarbon present in the reactor (with the balance being made up by the perfluorocarbon), preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons of the invention have a molecular weight (MW) greater than 30 a.m.u., preferably greater than 35 a.m.u, and more preferably greater than 40 a.m.u. In another embodiment, the fluorinated hydrocarbons of the invention have a MW greater than 60 a.m.u, preferably greater than 65 a.m.u, even more preferably greater than 70 a.m.u, and most preferably greater than 80 a.m.u. In still another embodiment, the fluorinated hydrocarbons of the invention have a MW greater than 90 a.m.u, preferably greater than 100 a.m.u, even more preferably greater than 135 a.m.u, and most preferably greater than 150 a.m.u. In another embodiment, the fluorinated hydrocarbons of the invention have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons of the invention have a MW in the range of from 30 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons of the invention have normal boiling points in the range of from about −100° C. up to the polymerization temperature, preferably a polymerization temperature of about 70° C. to about 115° C., preferably the normal boiling point of the fluorinated hydrocarbons is in the range of from −80° C. to about 90° C., more preferably from about −60° C. to about 85° C., and most preferably from about −50° C. to about 80° C. In an embodiment, the fluorinated hydrocarbons of the invention have normal boiling points greater than −50° C., preferably greater than −50° C. to less than −10° C. In a further embodiment, the fluorinated hydrocarbons of the invention have normal boiling points less than −5° C., preferably greater than −5° C. to less than −20° C. In one embodiment, the fluorinated hydrocarbons of the invention have normal boiling points greater than −10° C., preferably greater than 10° C. to about 60° C.

In another embodiment, the fluorinated hydrocarbons of the invention have a liquid density @ 20° C. (g/cc) less than 2 g/cc, preferably less than 1.6, and most preferably less than 1.50 g/cc. In one embodiment, the fluorinated hydrocarbons of the invention have a liquid density @ 20° C. (g/cc) less than 1.6 g/cc, preferably less than 1.55, and most preferably less than 1.50 g/cc. In one embodiment, the fluorinated hydrocarbons of the invention have a liquid density @ 20° C. (g/cc) less than 1.50 g/cc, preferably less than 1.45, and most preferably less than 1.40 g/cc.

According to another embodiment of the invention, the diluent comprises a mixture of at least one non-fluourinated hydrocarbon and at least one fluorinated hydrocarbon, wherein the mixture has a density @ 20° C. (g/cc) in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

In one embodiment, the fluorinated hydrocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another embodiment, the diluent used in the invention comprises any combination of two or more fluorinated hydrocarbons having the aforementioned MW, normal boiling point, ΔH Vaporization, and liquid density values and ranges. In a preferred embodiment, the fluorinated hydrocarbons useful in the process of the invention have a MW greater than 30 a.m.u, preferably greater than 40 a.m.u, and a liquid density less than 2.0 g/cc, preferably less than 1.8 g/cc. In yet another preferred embodiment, the fluorinated hydrocarbons useful in the process of the invention have a liquid density less than 1.9 g/cc, preferably less than 1.8 g/cc, and a normal boiling point greater than −100° C., preferably greater than −50° C. up to the polymerization temperature of the process, which is preferably as high as 115° C., more preferably less than 100° C., still more preferably less than 90° C., and most preferably less than 80° C. In one embodiment, the fluorinated hydrocarbons useful in the process of the invention have a MW greater than 30 a.m.u, preferably greater than 40 a.m.u, and a ΔH Vaporization in the range of from 100 kJ/kg to 500 kJ/kg, and optionally a liquid density less than 2.0 g/cc, preferably less than 1.8 g/cc. In yet another embodiment, the fluorinated hydrocarbons useful in the process of the invention have a liquid density less than 1.9 g/cc, preferably less than 1.8 g/cc, and a normal boiling point greater than −100° C., preferably greater than −50° C. up to the polymerization temperature of the process, which is preferably as high as 115° C., more preferably less than 100° C., still more preferably less than 90° C., and most preferably less than 60° C., and optionally a ΔH Vaporization in the range of from 120 kJ/kg to 400 kJ/kg.

In yet another embodiment, the diluent includes one or more fluorinated hydrocarbon(s) alone or in combination with one or more non-fluorinated hydrocarbons. Examples of suitable, preferably inert, liquid hydrocarbons, for example, saturated hydrocarbons containing from 1 to 10, preferably 3 to 8, carbon atoms. Preferred examples include propane, n-butane, isobutane (MW of 58.12 a.m.u, a liquid density of 0.55 g/cc, and normal boiling point as above described of −11.75), n-pentane, isopentane (MW of 72.15 a.m.u, a liquid density of 0.62 g/cc, and normal boiling point of 27.85), neopentane, n-hexane, isohexane, and other saturated $C_6$ to $C_8$ hydrocarbons. In one embodiment, the diluent further comprises at least one $C_1$ to $C_{40}$ alkane.

In another embodiment, the fluorinated hydrocarbon is present in the diluent at greater than 5 weight %, based on the total weight of the diluent. Preferably the fluorinated hydrocarbon is present in the diluent at greater than 7 weight %, more preferably greater than 10 weight %, and most preferably greater than 15 weight %, based on the total weight of the diluent. In another embodiment, the fluorinated hydrocarbon is present in the diluent at not greater than 90 weight %, based on the total weight of the diluent. In another embodiment, the fluorinated hydrocarbon is present in the diluent at not greater than 80 weight %, or not greater than 70 weight %, or not greater than 60 weight %, or not greater than 50 weight %, based on the total weight of the diluent.

In another embodiment, the diluent material, which contains the fluorinated hydrocarbon as well as the other optional condensable fluid, is selected based upon its solubility or lack thereof in a particular polymer being produced. Preferred diluents have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the diluent, exposed for 90 seconds to evaporate excess fluid from the surface of the film, and weighed. The mass uptake is defined as the percentage increase in the film weight after soaking. The diluent is preferably selected so that the polymer has a mass uptake of less than 4 weight %, preferably less than 3 weight %, more preferably less than 2 weight %, even more preferably less than 1 weight %, and most preferably less than 0.5 weight %.

Ideally, the fluorocarbon is inert to the polymerization reaction. By "inert to the polymerization reaction" is meant that the fluorocarbon does not react chemically with the monomers, catalyst system or the catalyst system components. (This is not to say that the physical environment provided by an fluorocarbons does not influence the polymerization reactions, in fact, it may do so to some extent, such as affecting activity rates. However, it is meant to say that the fluorocarbons are not present as part of the catalyst system.)

In a preferred embodiment, the diluent, preferably, the fluorinated hydrocarbon(s) or mixtures thereof, are selected such that the polymer melting temperature Tm is reduced (or depressed) by not more than 15° C. by the presence of the condensable fluid. The depression of the polymer melting temperature ΔTm is determined by first measuring the melting temperature of a polymer by differential scanning calorimetry (DSC), and then comparing this to a similar measurement on a sample of the same polymer that has been soaked with the condensable fluid. In general, the melting temperature of the soaked polymer will be lower than that of the dry polymer. The difference in these measurements is taken as the melting point depression ΔTm. It is well known to those in the art that higher concentrations of dissolved materials in the polymer cause larger depressions in the polymer melting temperature (i.e., higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the condensable fluid to be evaluated). As described in the reference above, it is important to ensure that the second part of the test, conducted in the presence of the liquid, is done in a sealed container so that the liquid is not flashed during the test, which could introduce experimental error. In one embodiment, the ΔTm is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

In a preferred embodiment, the fluorocarbon(s) or mixtures thereof, preferably, the fluorocarbon or mixtures thereof, are selected such that these are miscible to the hydrocarbon diluent and liquid monomers when a mixture is used. By miscible is meant that the flurorcarbon and the hydrocarbon mixture will not have liquid phase separation. Liquid phase separation is determined by mixing a fluorocarbon and a hydrocarbon in a vessel with sight glass at polymerization conditions, then visually observing if phase separation occurs after vigorous mixing for five minutes.

III. Ziegler-Natta Catalyst System

The polymer produced according to this invention is formed in a catalytic process using a Ziegler-Natta catalyst system. The use of the Ziegler-Natta catalyst system provides the capability of producing a polymer product with little to no reactor fouling, and producing a polymer product that is very low in crystallinity.

The catalyst system of the invention will typically include a Ziegler-Natta catalyst compound and preferably an activator compound. In another preferred embodiment, the catalyst system will include one or more support materials and/or one or more co-catalysts. The components of the catalyst system are chosen to be capable of being utilized in the polymerization process selected. For example, polymerization may be conducted in a slurry and/or in a solution where the slurry and solution are used separately or combined and introduced into a polymerization reactor. The catalysts, co-catalysts and activator compounds can include the support materials. As used herein, the notation numbering scheme for the Periodic Table Groups are used as set out in *Chemical And Engineering News*, 63(5), 27, (1985).

A. Ziegler-Natta Transition Metal Component

The use of Ziegler-Natta type catalysts is particularly preferred in this invention. Ziegler-Natta type catalysts are catalyst compositions that incorporate Ziegler-Natta transition metal components. Typically, the transition metal component is a compound of a Group IVB, VB, or VIB metal. The transition metal component is generally represented by any one of the formulas: $TrX_{4-q}(OR^1)_q$, $TrX_{4-q}R^2_q$, $VOX_3$, and $VO(OR^1)_3$, wherein Tr is a Group IVB, VB, or VIB metal, preferably a Group IVB or VB metal, and more preferably titanium, vanadium or zirconium, q is 0 or a number equal to or less than 4, X is a halogen and $R^1$ is an alkyl group, aryl group or cycloalkyl group having from 1 to 20 carbon atoms, and $R^2$ is an alkyl group, aryl group, aralkyl group, substituted aralkyl group, and the like. The aryl, aralkyls, and substituted aralkyls contain from 1 to 20 carbon atoms, preferably 1 to 10 carbon atoms. In a preferred embodiment of the formula $TrX_{4-q}R^2_q$, the hydrocarbyl group, $R^2$, does not contain an H atom in the beta position. Illustrative, but non-limiting examples of alkyl groups are methyl, neo-pentyl, 2,2-dimethylbutyl, 2,2-dimethylhexyl; aryl groups such as phenyl, naphthyl; aralkyl groups such as benzyl; cycloalkyl groups such as 1-norbornyl. Mixtures of these transition metal compounds can be employed if desired.

Illustrative examples of titanium compounds include: $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_{12}H_{25})Cl_3$, $Ti(OC_2H_5)_2Br_2$, $Ti(OC_8H_{17})_2Br_2$ and $TiCl_3$·examples of vanadium compounds include: $VCl_4$, $VOCl_3$, $VO(OC_2H_5)_3$, and $VO(OC_4H_9)_3$. Illustrative examples of zirconium compounds include: $ZrCl_4$, $ZrCl_3(OC_2H_5)$, $ZrCl_2(OC_2H_5)_2$, $ZrCl(OC_2H_5)_3$, $Zr(OC_2H_5)_4 ZrCl_2(OC_4H_9)_2$, and $ZrCl(OC_4H_9)_3$.

Mixtures of the transition metal compounds may be usefully employed, no restriction being imposed on the number of transition metal compounds that may be incorporated. Any halogenide and alkoxide transition metal compound or mixtures thereof can be usefully employed.

B. Support

In one embodiment of the invention, the catalyst composition of the invention comprises a support material. The support material can be any solid, particularly porous support material such as talc or inorganic oxides, or resinous support materials such as a polyolefin. Preferably, the support material is an inorganic oxide.

Examples of suitable inorganic oxide materials include Group IIA, IIIA, IVA or IVB metal oxides such as silica, alumina, silica-alumina and mixtures thereof. Other inorganic oxides that may be employed either alone or in combination with the silica, alumina or silica-alumina are magnesia, titania, zirconia, and the like. Other suitable support materials, however, can be employed, for example, polyolefins such as polyethylene.

In another embodiment, the inorganic oxide support is any particulate oxide or mixed oxide that has been thermally or chemically dehydrated such that it is substantially free of moisture. Thermal treatment is preferably carried out in vacuum or while purging with a dry inert gas such as nitrogen at a temperature of about 100° C. to about 1000° C., and preferably from about 300° C. to about 800° C. Pressure considerations are not critical. The duration of the thermal treatment can be from about 1 to about 24 hours; however, shorter or longer times can be employed provided equilibrium is established with the surface hydroxyl groups.

Chemical dehydration as an alternative method of dehydration of the metal oxide support material can advantageously be employed. Chemical dehydration converts water and hydroxyl groups on the oxide surface to inert species. Useful chemical agents include, for example, $SiCl_4$, and chlorosilanes, such as trimethylchlorosilane, dimethyaminotrimethylsilane and the like. Chemical dehydration is accomplished by slurrying the inorganic particulate material, for example, silica in an inert low boiling hydrocarbon, such as, hexane. During the chemical dehydration reaction, the silica should be maintained in a moisture and oxygen-free atmosphere. To the silica slurry is then added a low boiling inert hydrocarbon solution of the chemical dehydrating agent, such as, dichlorodimethylsilane. Preferably, the temperature ranges during chemical dehydration reaction are from about 25° C. to about 120° C.; however, higher and lower temperatures can be employed. Preferably, the temperature will be about 50° C. to about 70° C.

The chemical dehydration procedure should be allowed to proceed until sufficient moisture is removed from the particulate support material as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The specific particle size, surface area, pore volume, and number of surface hydroxyl groups characteristic of the inorganic oxide are not critical to its utility in the practice of the invention. It is preferred, however, that the inorganic oxides have an average particle size in the range of from about 30 to 600 microns, preferably from about 30 to 100 microns; a surface area of from about 50 to 1,000 square meters per gram, preferably from about 100 to 400 square meters per gram; and a pore volume of from about 0.5 to 3.5 cc per gram; preferably from about 0.5 to 2 cc per gram.

C. Cocatalysts

In a preferred embodiment of the invention the catalyst system includes a cocatalyst composition. The cocatalyst composition comprises an organic compound of a metal of Groups 1 through 3 of the Periodic Table.

Examples of organic metal compounds employed as cocatalysts include organic compounds of lithium, magnesium, calcium, zinc, and aluminum. Organic aluminum compounds are preferred. Particularly preferred organic aluminum compounds are those represented by the general formula $R_nAlX_{3-n}$ (wherein R denotes an alkyl group or an aryl group having from 1-18 carbon atoms, X denotes a halogen atom, an alkoxy group or a hydrogen atom, and n denotes a desired number in the range of 1 to 3). Examples of organic aluminum compounds include alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride, respectively having 1 to 18 carbon atoms, preferably 2 to 6 carbon atoms, and mixtures and complex compounds thereof. Illustrative examples of such organic aluminum compounds include trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride.

In one embodiment, trialkyl aluminum compounds, specifically trimethyl aluminum, triethyl aluminum, and triisobutyl aluminum, are preferred. In another embodiment, trialkyl aluminum compounds are used in combination with other organic aluminum compounds such as diethyl aluminum chloride, ethyl aluminum dichloride, ethyl aluminum sesquichloride, diethyl aluminum ethoxide, or diethyl aluminum hydride. The organic aluminum compounds may be used in the form of a mixture or complex compound.

In another embodiment, the cocatalyst is an organic aluminum compound having two or more aluminum atoms linked through an oxygen atom or nitrogen atom. Examples of such organic aluminum compounds include:

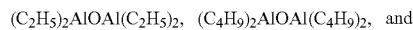

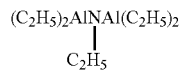

Examples of organic compounds of metals other than aluminum are diethyl magnesium, ethyl magnesium chloride, diethyl zinc, and such compounds as $LiAl(C_2H_5)_4$ and $LiAl(C_7H_{15})_4$. The ratio of organometallic compound to transition metal component will generally be in the range of from about 1 to about 100 moles of aluminum per mole of transition metal component metal on the support. The organometallic compound can be used in a suitable hydrocarbon solvent such as isopentane, hexane, or toluene.

D. Alkali Earth or Alkali Metal Halide Compounds

In another preferred embodiment of the invention, the catalyst composition includes one or more alkali earth or alkali metal halide compounds. Preferably, the catalyst composition includes a titanium transition metal and one or more alkali earth or alkali metal halide compounds. Such catalyst compositions include at least one alkali earth or alkali metal halide compound in an amount to dilute titanium centers (and hence increase the active centers), stabilize active titanium centers from the deactivation process, and/or enhance the chain transfer process during polymerization. Magnesium halide is a preferred alkali earth halide. Examples of magnesium halide compounds include $MgCl_2$ and $MgBr_2$. $MgCl_2$, particularly anhydrous $MgCl_2$ is preferred. In one embodiment, from about 1 to 10 moles of magnesium chloride per mole of the titanium compound are used. Other suitable alkali earth compounds include those represented by the formula $Mg(OR)_2$, wherein R is an alkyl group, preferably a $C_1$-$C_8$ alkyl group, as well as the compound $Mg(OH)Cl$.

E. Electron Donors

In another embodiment of the invention, the catalyst system of the invention contains at least one non-transition metal electron donor. Illustrative but non-limiting examples of electron donor compounds, known as "Lewis Bases," include aliphatic and aromatic esters, aliphatic ethers, cyclic ethers, and aliphatic ketones. Examples of preferred compounds include tetrahydrofuran, dioxane, acetone, methyl formate and diethyl ether. A particularly preferred electron donor compound is tetrahydrofuran. The molar ratio of the electron donor compound to transition metal compound, particularly titanium containing compound, ranges from about 2 to 30 moles, and more preferably from about 5 to 15 moles of electron donor compound per mole of the transition metal compound.

F. Surface Modification

In another embodiment of the invention, the support material is surface modified. Surface modification is preferably accomplished by treating the support material such as silica, alumina or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas $R^1MgR^2$ and $R^1R^2AlR^3$ wherein each of $R^1$, $R^2$ and $R^3$ are the same or different alkyl groups, aryl groups, cycloalkyl groups, aralkyl groups, alkoxide groups alkadienyl groups or alkenyl groups. The hydrocarbon groups $R^1$, $R^2$ and $R^3$ preferably contain from 1 to 20 carbon atoms and more preferably from 1 to 10 carbon atoms.

In one embodiment, the organometallic compound is added in a suitable solvent to a slurry of the support material. Contact of the organometallic compound in a suitable solvent and the support is preferably maintained for about 30 to 180 minutes and preferably for 60 to 90 minutes at a temperature in the range of from 20° C. to 100° C. The diluent employed in slurrying the support can be any of the solvents employed in solubilizing the organometallic compound and is preferably the same.

The amount of surface modifying agent employed in preparation of the surface modified support material can vary over a wide range. Generally the amount will be in the range of from $1\times10^{-6}$ moles to about $2\times10^{-3}$ moles of modifying agent per gram of support material. However greater or lesser amounts can be employed.

Illustrative, but non-limiting examples of magnesium compounds which may be suitably employed as a surface modifying agent for the support materials in accordance with the invention are dialkyl magnesiums such as diethylmagnesium, dipropylmagnesiums, di-isopropylmagnesium, di-n-butylmagnesium, di-isobutylmagnesium, diamylmagnesium, di-n-octylmagnesium, di-n-hexylmagnesium, di-n-decylmagnesium, and di-n-dodecylmagnesium; dicycloalkylmagnesiums, such as dicyclohexylmagnesium; diarylmagnesiums such as dibenzylmagnesium, ditolylmagnesium, and dixylylmagnesium, alkylalkoxy magnesium such as ethyl magnesium ethoxide and the like.

Illustrative, but non-limiting examples of the aluminum compounds which may be suitably employed in accordance with the invention are trialkylaluminums such as trimethylaluminum, triethylaluminum, tripropylaluminum, triisobutylaluminum, tri-n-hexylaluminum, and tri-n-octylaluminum. Preferably, the organoaluminum compounds are trimethylaluminum, triisobutylaluminum, and triethylaluminum.

Preferably, the surface modifying agents are the organomagnesium compounds which will have from one to six carbon atoms and most preferably $R^1$ and $R^2$ are different. Illustrative examples of preferred magnesium compounds include ethyl-n-propylmagnesium, ethyl-n-butylmagnesium, amyl-n-hexylmagnesium, n-butyl-sec-butylmagnesium, n-butyl-n-octylmagnesium and the like. Mixtures of hydrocarbylmagnesium compounds may be suitably employed such as, for example, di-n-butylmagnesium and ethyl-n-butylmagnesium.

Magnesium hydrocarbyl compounds are generally obtained from commercial sources as mixtures of the magnesium hydrocarbon compound with a minor amount of aluminum hydrocarbyl compound. A minor amount of aluminum hydrocarbyl is preferably present in order to facilitate solubilization and/or reduce the viscosity of the organomagnesium compound in hydrocarbon solvent. The hydrocarbon solvent usefully employed for the organomagnesium compound can be any of the well known hydrocarbon liquids, for example, hexane, heptane, octane, decane, dodecane, or mixtures thereof, as well as aromatic hydrocarbons such as benzene, toluene, xylene, etc.

A preferred organomagnesium complex with a minor amount of aluminum alkyl is represented by the formula $(R^1MgR^2)_x(R_3{}^4Al)_y$ wherein $R^1$ and $R^2$ are defined as above, $R^4$ is defined as $R^1$ and $R^2$ and x is greater than 0. The ratio of y to (y+x) is from 0 to less than 1, preferably from 0 to about 0.7 and most desirably from about 0 to 0.1. Illustrative examples of preferred organomagnesium-organoaluminum complexes are $[(n-C_4H_9)(C_2H_5)Mg][(C_2H_5)_3Al]_{0.02}$, $[(n-C_4H_9)_2Mg][(C_2H_5)_3Al]_{0.013}$, $[(n-C_4H_9)_2Mg][(C_2H_5)_3Al]_{2.0}$ and $[(n-C_6H_{13})_2Mg][(C_2H_5)_3Al]_{0.01}$.

Hydrocarbon soluble organomagnesium materials can be prepared by conventional methods. One such method involves, for example, the addition of an appropriate aluminum alkyl to a solid dialkylmagnesium in the presence of an inert hydrocarbon solvent. The organomagnesium-organoaluminum complexes are further described in the literature, for example in U.S. Pat. Nos. 3,737,393 and 4,004,071, the detailed descriptions of each being incorporated herein by reference. However, any other suitable method for preparation of organometallic compound may be employed.

G. Pre-activation

In one embodiment of the invention, supported catalyst precursors are pre-activated. Pre-activation can influence the morphology of polymer products produced by the process of the invention, in particular the bulk density of the polymers. In one embodiment, the supported catalyst precursors are pre-activated with alumoxane and/or various bulky aluminum- alkyls at an activator to transition metal, particularly titanium, molar ratio of from about 0.1 to about 15, more preferably about 0.1 to 10. Pre-activation can be achieved using a hydrocarbon slurry medium typically at temperatures from about 15° C. to 30° C. with continuous mixing followed by drying at temperatures between about 30° C. to 100° C., and preferably about 50° C. to 80° C., to obtain a free-flowing solid. Illustrative but non-limiting examples of pre-activating agents include diethyl aluminum chloride (DEAC), trihexyl aluminum (TnHAL), trioctyl aluminum (TnOCTAL), methyl aluminoxane (MAO), and mixtures thereof.

Activation of the pre-activated catalyst precursor, prior to polymerization, can be accomplished by feeding a slurry of the pre-activated precursor into a suitable reactor under a nitrogen atmosphere, typically in an inert hydrocarbon diluent such as hexane, heptane, isopentane, toluene, mineral oil or other hydrocarbons known to be useful in the field, followed by the addition of an alumoxane-based cocatalyst. The cocatalyst is preferably diluted with from about 2 to 40 weight percent of a hydrocarbon solvent similar to the one used to slurry the pre-activated catalyst, and is subsequently added to the reactor as a solution. Preferably, the total molar ratio of aluminum to transition metal, preferably titanium, in the system is from 5 to 300, preferably from about 100 to about 250, and more preferably from 50 to 150, depending on the specific embodiment. Illustrative but non-limiting examples of the cocatalyst systems employed in the present invention include, but are not limited to, physical mixtures of alumoxane including polymeric methyl aluminoxane (MAO), co-polymeric isobutyl methyl aluminoxane (CoMAO), and mixtures of MAO or CoMAO along with conventional trialkyl aluminum compounds, such as triethyl aluminum (TEAL), tri-isobutyl aluminum (TIBA), trimethyl aluminum (TMA), trihexyl aluminum, diethyl aluminum chloride and mixtures thereof, said physical mixtures of alumoxane and trialkyl aluminum compounds comprising 10 to 90 mole percent alumoxane, and preferably 10 to 50 mole percent alumoxane, wherein the mole percent corresponds to the molar ratios of aluminum from each compound.

IV. Monomers

The processes described herein may be used in any type of polymerization process employing propylene and one or more additional monomers (i.e., comonomers). Preferably the polymerization process includes propylene and ethylene. Additional monomers can be included if desired. Examples of additional monomers include one or more unsaturated hydrocarbons having from 4 to 30 carbon atoms, preferably 4 to 12 carbon atoms, and more preferably 4 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly preferred monomers that can be included in addition to propylene and ethylene include one or more of butene-1, pentene-1,4-methyl-pentene-1, hexene-1, octene-1, decene-1,3-methyl-pentene-1, norbornene, norbornadiene, 3,5,5-trimethyl-1-hexene, 5-ethyl-1-nonene, vinyl norbornene, and ethylidene monomers.

In one embodiment, ethylene and propylene is polymerized with at least one different comonomer to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In one embodiment of the invention, copolymer is made by mixing together a diluent containing at least one fluorinated hydrocarbon, a Ziegler-Natta catalyst system, and an olefin feed containing at least two monomers to form copolymer, particularly propylene copolymer. In one particular embodiment, the olefin feed contains at least 25 weight % propylene and greater than 10 weight % ethylene, based on total weight of the feed. Preferably, the olefin feed contains less than 90 weight % propylene, based on total weight of the olefin feed. More preferably, the olefin feed contains from 25 weight % to less than 90 weight % propylene, based on total weight of the olefin feed. In another particular embodiment, the olefin feed further contains one or more comonomers selected from the group consisting of hydrocarbons, polar moieties, and mixtures thereof.

In another embodiment, the olefin feed from which the copolymer is made contains from 40 weight % to less than 90 weight % propylene, based on total weight of the olefin feed. In another embodiment, the olefin feed contains from 50 weight % to less than 90 weight % propylene, based on total weight of the olefin feed.

The copolymer of the invention can be made from an olefin feed containing a wide range of ethylene. In one embodiment, the olefin feed contains less than 75 weight % ethylene, based on total weight of the olefin feed. In yet another, the olefin feed contains less than 60 weight %, or less than 50 weight %, or less than 25 weight % ethylene, or less than 15 weight % ethylene, based on total weight of the olefin feed. In another embodiment, the olefin feed contains at least 20 weight % ethylene, based on total weight of the olefin feed.

Preferably, the olefin feed contains greater than 10 weight % and less than 75 weight % ethylene, based on total weight of the olefin feed. Alternatively, the olefin feed contains from 15 weight % to 60 weight % ethylene, or from 15 weight % to 50 weight % ethylene, or from 15 weight % to 40 weight % ethylene, based on total weight of the olefin feed.

V. Process Conditions

A. General Process Conditions and Reactor Systems

This invention pertains to any prepolymerization and/or polymerization process, and the process is suitably carried out over a wide range of temperatures and pressures. Such processes include, for example, solution, gas phase, slurry phase, medium pressure and high pressure processes or any combination thereof.

Desirably, little to no polymer "swelling" is exhibited as indicated by little or no suppression of the polymer melting temperature, Tm, glass transition temperature, Tg, and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

Polymerization processes according to this invention are carried out at any temperature or temperature ranges effective in carrying out the polymerization process. In general, effective temperatures are at least about −20° C., 0° C., 10° C. or 20° C. Preferred ranges can go up to about 160° C. More specific ranges include from about 10° C. to 140° C., and more preferably from about 20° C. to 120° C. Lower temperatures are particularly preferred to provide an added benefit of forming discrete particles of the polymer. Preferred lower temperatures include those temperatures at which the polymerization is carried out at a temperature of less than 100° C., more preferably less than 80° C., and most preferably less than 60° C. Preferably, the polymerization temperature is above room temperature (23° C.), preferably above 25° C., preferably above 27° C., preferably above 30° C., preferably above 50° C., preferably above 70° C.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment, one or more of the monomers are prepolymerized. Prepolymerization is particularly preferred to provide an added benefit of forming discrete particles of the polymer. In one embodiment of the invention, propylene is prepolymerized prior to polymerization with any other comonomer such as ethylene. One or more comonomers such as ethylene or one or more $C_4$ to $C_{30}$ olefin(s) or alpha-olefin(s), can also be prepolymerized with propylene in the presence of the catalyst systems of the invention described above prior to the main polymerization.

In one embodiment, the prepolymerization process is carried out in a slurry phase at effective prepolymerization temperatures and pressures, such as those temperatures and pressures described herein for the polymerization process. Prepolymerization can take place with any olefin monomer or combination and/or in the presence of any molecular weight controlling agent such as hydrogen. For examples of prepolymerization procedures, see U.S. Pat. Nos. 4,748,221; 4,789,359; 4,923,833; 4,921,825; 5,283,278; and 5,705,578 and European publication EP-B-0279 863 and PCT Publication WO 97/44371 all of which are herein fully incorporated by reference.

The prepolymerization and/or polymerization process can be carried out in a batch or continuous process. By continuous is meant a system that operates (or is intended to operate) without interruption or cessation. For example, a continuous process to produce a polymer would be one in which the reactants are continuously introduced into one or more reactors and polymer product is continually withdrawn. In a preferred embodiment any of the polymerization process of the invention is a continuous process.

In one embodiment, the polymerization is carried out where the catalyst, monomer, and diluent are present in a single phase. In a preferred embodiment, polymerization is carried out as a continuous polymerization process in which catalyst, monomer, and diluent are present in a single phase.

The reactor used in the polymerization process of this invention will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 5 weight % (based on the total weight of the monomers, diluent, and catalyst system), preferably greater than 15 weight %, greater than 30 weight % in another embodiment. In yet another embodiment, the feed-stream will contain from 5 weight % to 50 weight % monomer concentration based on the total weight of monomer, diluent, and catalyst system.

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight average molecular weights.

B. Slurry Phase

One embodiment of the invention incorporates the use of a slurry phase polymerization process, preferably as a continuous polymerization process. The slurry polymerization process can be carried out at various pressures as noted above, preferably in the range of from about 1 to about 100 atmospheres, more preferably in the range of from 1 to 50 atmospheres. Operating temperatures are generally in the range as described above.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. An example of such a technique is described in U.S. Pat. No. 3,248,179, which is filly incorporated herein by reference. Other slurry processes include those employing one or more of a loop reactor or a stirred tank reactor. A plurality of such reactors can be used in series, parallel, or combinations thereof. Non-limiting examples of slurry processes include continuous loop or stirred tank processes. Also, other examples of slurry processes are described in U.S. Pat. Nos. 4,613,484 and 5,986,021, which are herein fully incorporated by reference. Such combinations of stirred slurry, loop slurry, or stirred and loop slurry reactors are useful for production of bimodal polymers.

In one embodiment, the reactor used in the slurry process of the invention is capable of producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is capable of producing greater than 15,000 lbs of polymer per hour (6804 kg/hr), preferably greater than 25,000 lbs/hr (11,340 kg/hr) to about 100,000 lbs/hr (45,500 kg/hr).

In one embodiment, polymer granules and supported catalyst particles are present as solid particles in the slurry reactor, and the slurry diluent is a fluorinated hydrocarbon, one or more hydrocarbons, or mixtures thereof. In one embodiment, the concentration of solid particles in the slurry is equal to or greater than 10 vol %. In another embodiment, the solid particles are present in the slurry at a concentration equal to or greater than 25 vol %. In yet another embodiment, the solid particles are present in the slurry at a concentration less than or equal to 75 vol %. In yet another embodiment, the solid particles are present in the slurry at concentrations ranging from 1 to 70 vol %; from 5 to 70 vol %; from 10 to 70 vol %; from 15 to 70 vol %; from 20 to 70 vol %; from 25 to 70 vol %; from 30 to 70 vol %; or from 40 to 70 vol %.

C. Reactors and Reactor Systems

One or more reactors in series or in parallel may be used in this invention. Catalyst component(s) (and any activator employed) may be delivered as a solution or slurry, either separately to the reactor, activated in-line just prior to the reactor, or preactivated and pumped as an activated solution or slurry to the reactor. A preferred operation is two solutions activated in-line. Examples of methods for introducing multiple catalysts into reactors are found in U.S. Pat. No. 6,399, 722 and WO 01/30861 A1, which are incorporated herein by reference. While these references may emphasize gas phase reactors, the techniques described are equally applicable to other types of reactors, including stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst component may also be added to both reactors, with one component being added to a first reactor and other components added to other reactors.

In one embodiment, a continuous flow stirred tank-type reactor is used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation. The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In another embodiment of the invention, a reactor capable of performing a continuous slurry process is used. A reactor pump impeller is generally employed in the reactor and can be of the up-pumping variety or the down-pumping variety. The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

Polymer product that leaves the reactor unit of the reaction system contains entrained material that is preferably separated from the polymer. Included in this polymer product are unreacted monomers and undesirable hydrocarbon by-products of the reaction process. Also included are any diluent and/or solvent materials that are not reactive to form desirable polymer, and are especially problematic with regard to removal and/or recovery.

A substantial portion (i.e., a majority) of the polymer product is separated from the non-polymer product by sending product effluent from the polymer reactor to a polymer recovery system. The polymer recovery system is operated by controlling a variety of parameters including temperature, pressure, vapor-liquid separation systems, and purge systems or vessels.

In one embodiment, the polymer recovery system incorporates the use of an inert gas to purge or scrub out undesirable entrained material from the polymer product. The inert gas is a composition that is substantially non-reactive with the polymer product, and can be used in sufficient quantity as a driving force to separate the non-polymer components from the polymer product. Examples of useful inert gases include air and nitrogen.

In a particular embodiment, polymer associated with entrained materials such as unreacted monomer, hydrocarbon by-product and diluent such as fluorinated hydrocarbon is recovered from a polymerization reaction process and sent to a polymer recovery system. Preferably, the polymer recovery system includes a purge system or vessel, more preferably a purge bin, and the polymer and associated entrained materials are sent to the purge system. The inert gas composition is then input into the purge system to purge or drive out the entrained materials, thereby forming a purge stream, which is recovered from the purge system.

Entrained, non-polymer product material that is separated and recovered as a purge stream from the polymer product is preferably further separated into component fractions or a plurality of streams and each fraction or stream stored, recycled or vented from the system as appropriate. It is preferred that diluent and unreacted monomer be separated and returned to the reactor. These streams can be separated and recovered as individual streams or as a combined stream. If an inert gas is used in the recovery system, it is preferred that the inert gas also be separated, preferably as an individual stream, and recovered for re-use in the polymer recovery system and/or in the reaction portion of the polymerization system.

In one embodiment, the effluent from the polymerization reactor is flashed in a first flash to vaporize from about 50% to about 100% of the liquid medium to produce concentrated polymer effluent and vaporized liquid. Flashing can be accomplished by reducing pressure or by heating. Preferably, the vapor obtained in the first flash is condensed, more preferably the vapor is condensed without compression, and most preferably is compressed by heat exchange. Preferably, the first flash is operated at from about 140 psia (965 kPa) to about 315 psia (2.2 MPa).

In another embodiment, the fluorocarbon is condensed and recycled. In another embodiment, polymer solids are discharged from a first flash to a second flash through a seal chamber. The seal chamber preferably is of sufficient dimension such as to maintain a volume of polymer solids/slurry in the seal chamber sufficient to maintain a pressure seal.

In another embodiment, concentrated polymer effluent and vaporized liquid are continuously separated. In a preferred aspect, the concentrated polymer effluent slurry is flashed in a second flash to vaporize liquid.

In one embodiment of the invention, the polymerization effluent from the polymerization reactor is heated and then sent to a flash operation. Preferably, the polymerization effluent is heated to a temperature below the fusion temperature of the polymer. The quantity of heat supplied to the polymerization effluent is preferably at least equal to that quantity of heat which equals the heat of vaporization of the liquid medium which is to be flashed.

The polymer solids can be separated by any appropriate physical means as well. One non-limiting example is to separate the polymer solids from the diluent using a centrifuge apparatus.

In another embodiment, the residual fluorocarbon diluent present in a polymer produced with fluorocarbon is less than residual hydrocarbon present in a polymer produced with hydrocarbon under comparable processing conditions.

VI. Polymer Products

A. General Polymer Products

The polymers produced by the process of the invention can be used in a wide variety of products and end-use applications. The polymers produced by the process of the invention include elastomers, plastomers, thermoplastics, polypropylene and polypropylene copolymers.

B. Density

The polymers according to this invention can be produced at different crystallinity levels. For high moisture barrier applications, high molded part rigidity, others, polypropylene of high crystallinity is desired. For flexible films, seal layer films, tough films and molded parts and high clarity articles, polypropylenes of lower crystallinity are favored. Crystallinity can be measured by several techniques (see Polypropylene Handbook, Ed. E. P. Moore, Jr., etc.), of which density measurement is one. The density of commercial homopolymer, made via a 4th generation or later catalyst, is typically about 0.905 g/cm3. When the crystallinity is lowered, as when a comonomer is incorporated, the density decreases. Typical, commercial random copolymers (RCPs) containing about 6 weight % or so of comonomer (like ethylene) have density values about 0.890 g/cm3. At even higher comonomer levels, the density is further reduced because of the lower crystallinity. Density is measured in accordance with ASTM method 1505.

C. Crystallinity

Preferably, the polymers made according to this invention are low in crystallinity as measured by differential scanning calorimetry (DSC). In one embodiment, the polymers are exceptionally soft, while still retaining substantial tensile strength and elasticity.

In one embodiment of the invention, the polymer has crystallinity of greater than or equal to 5%. In another embodiment, the polymer has crystallinity of greater than or equal to 10%, or greater than or equal to 25%, or equal to 30%. In an additional embodiment, the polymer has crystallinity less than 50%, less than 40%, or less than 30%, or less than 20%. As referred to herein, the crystallinity is based on total of heat of fusion from all melting peaks displayed in the second cooling-melting cycle when multiple peaks displayed. Total of heat of fusion is determined using the procedure described below.

D. Diene Content

In another embodiment of the invention, the polymer produced by this invention has diene-derived units. Dienes are nonconjugated diolefins which may be incorporated in polymers to facilitate chemical cross-linking reactions. The amount of diene incorporated are generally sufficient to produce cross-linked polymers, but without formation of polymer gels. Preferably, the amount of diene incorporated is less than 0.1 weight %, or less than 0.01 weight %. The presence or absence of diene can be determined by conventional NMR techniques.

E. Melt Index

The invention is capable of producing a polymer having a melt index as appropriate for the desired end use. The melt index (MI) is preferably measured according to ASTM D 1238(B). In one embodiment, the polymer has a melt index of from about 1 dg/min to 3000 dg/min. Preferably, the polymer has a melt index of from about 10 dg/min to about 1000 dg/min, and most preferably from about 20 to about 750 dg/min. In a particular embodiment, a propylene copolymer can be produced that has a melt index of from about 10 dg/min to about 2500 dg/min, or from about 15 dg/min to about 2000 dg/min.

F. Melt Flow Rate (MFR)

The invention is capable of producing a polymer having a MFR as appropriate for the desired end use. For purposes of the invention, MFR is measured according to ASTM D 1238-95. In one embodiment, the polymer has a MFR in the range of from 0.2 to 5000 dg/min, preferably, from 0.4 to 3000 dg/min, and preferably from 1 to 2500 dg/min.

G. Melting point

The invention is capable of producing a polymer having a melting temperature or melting point as appropriate for the desired end use. In one embodiment, a polymer is produced having a melting point, as measured by Differential Scanning Calorimetry (DSC) analysis (ASTM E-794-95), of greater than or equal to 10° C. In another embodiment, the polymer has a melting point of greater than or equal to 25° C. or greater than or equal to 35° C. In a preferred embodiment, the polymer has a melting point in a range of from about 10° C to 200° C., preferably in the range of from about 30° C. to 170° C., preferably in the range of from about 30° C. to 130° C., more preferably in the range of from about 40° C. to about 110° C. As the primary melting peak for polymers displayed multiple melting curves in the second cooling-heating cycle as determined using the procedure described below.

H. Heat of Fusion

The invention is capable of producing a polymer having a relatively low heat of fusion. In one embodiment, the polymer that is produced has a heat of fusion of greater than or equal to 5 J/g. In another embodiment, the polymer has a heat of fusion greater than or equal to 10 J/g, or greater than or equal to 20 J/g, or greater than or equal to 30 J/g, or greater than or equal to 35 J/g. In yet another embodiment, the polymer that is produced has a heat of fusion of from 5 J/g to 110 J/g, more preferably from 10 J/g to 100 J/g, and most preferably from 20 J/g to 80 J/g, as determined by DSC using the procedure described below.

A preferred procedure used in the present application for Differential Scanning Calorimetry (DSC) is described as follows. Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute, called first melt. The sample was kept at about 200° C. for 5 minutes before a second cooling-heating cycle was applied. During the second cycle, the sample was cooled from 200° C. to −50 ° C. at a rate of 10° C./minute, call second cool, and then kept at −50° C. for 5 minutes and heated to 200° C. at a rate of 10° C./minute, called second melt. All the thermal events in both the first and second cycle were recorded. The melting temperature (Tm) was the peak temperature of a melting curve and the crystallization temperature (Tc) was the peak temperature of a cooling curve. Tm, Tc and heat of fusion were obtained from the thermal events in the second cooling-heating cycle unless otherwise noted. Areas under the melting curves were measured and used to determine the heat of fusion and the degree of crystallinity. The percent of crystallinity was calculated using the formula, [area under the curve (Joules/gram)/B (Joules/gram)] * 100, where B is the heat of fusion for the homopolymer of the major monomer component. These values for B were obtained from the *Polymer Handbook*, Fourth Edition, published by John Wiley and Sons, New York, 1999. A value of 189 J/g (B) was used as the heat of fusion for 100% crystalline polypropylene. For polymers displaying multiple melting and/or multiple crystallization peaks in the second cooling-heating cycle, all the peak crystallization temperatures (Tc) and peak melting temperatures (Tm) were reported. For the purpose of this invention and the claims thereto, Tm and Tc referred to were obtained from the primary melting and the primary cooling curve, respectively. The primary melting peak was defined as the melting peak with greatest heat of fusion, the primary cooling peak was defined as the cooling peak with greatest heat of crystallization. The heat of fusion for each melting peak was calculated individually. Crystallinity was calculated using the sum of heat of fusion from all melting peaks in the second cooling-heating cycle.

I. Molecular Weight and Molecular Weight Distribution

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Molecular weight (Mw, Mn, and Mz) and molecular weight distribution of the polymers were determined using gel permeation chromatography (GPC) on a Water 150C high temperature chromatographic unit equipped with a DRI detector and four linear mixed bed columns (Polymer Laboratories PLgel Mixed-B LS, 20-micron particle size). The oven temperature was at 160° C. with the auto sampler hot zone at 160° C. and the warm zone at 145° C. About 0.2 weight % of polymer sample was dissolved in 1,2,4-trichlorobenzene containing 200 ppm 2,6-di-t-butyl-4-methylphenol. The flow rate was 1.0 milliliter/minute and the injection size is 100 microliters.

The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems* 3rd ed., Hemisphere Pub. Corp., NY, (1989) 155-160; U.S. Pat. No. 4,540,753; Verstrate et al., Macromolecules, vol. 21, (1988) 3360; and references cited therein. In one embodiment of the invention, the polymer that is produced according to the invention has a weight average molecular weight (Mw) of from 5,000 to 5,000,000, or from 20,000 to 1,000,000. In another embodiment of the invention, the polymer has a molecular weight distribution (MWD), which is defined as a ratio of weight average molecular weight to number average molecular weight (MWD=$M_w/M_n$), of greater than 1.5, preferably from 1.5 to about 30. In some embodiments, the polymer has a $M_w/M_n$ of at least 2, preferably from about 2 to 20, while in other embodiments the polymer produced has a $M_w/M_n$, of at least 3, preferably from about 3 to 10. In an embodiment, the polymer of the invention has a narrow molecular weight distribution and a broad composition distribution, and vice-versa, such as those polymers described in U.S. Pat. No. 5,798,427, incorporated herein by reference.

J. Tacticity

The term "tacticity" refers to the stereochemical configuration of a polymer, and the properties of a polymer having side chains are affected by its tacticity. For example, adjacent monomer units having side chains can have either like or opposite configuration. If all monomer units have like configuration, the polymer is "isotactic." If adjacent monomer units have an alternating configuration, and this alternating configuration continues along the entire polymer chain, the polymer is "syndiotactic." If the configuration of monomer units is random, the polymer is "atactic." When two contiguous monomer units, a "diad," have the same configuration, the diad is called isotactic or "meso" (m). When the monomer units have opposite configuration, the diad is called "racemic" (r). For three adjacent monomer units, a "triad," there are three possibilities. If the three adjacent monomer units have the same configuration, the triad is designated mm. An rr triad has the middle monomer unit having an opposite configuration from either neighbor. If two adjacent monomer units have the same configuration and it is different from the third monomer, the triad is designated as having mr tacticity. For five contiguous monomer units, a "pentad," there are ten possibilities: mmmm, mmmr, rmmr, mmrr, mrmm, rmrr, mrmr, rrrr, rrrr, and mrrm. A completely syndiotactic polymer would have all rrrr pentads, while a completely isotactic polymer would have all mmmm pentads. The configuration can be determined by $^{13}C$ nuclear magnetic resonance spectroscopy as described in *Macromolecules* 8 687 (1975) and in *Macromolecules* 6 925 (1973) and references cited therein. For more information on polymer stereochemistry, see G. Odian, *Principles of Polymerization*, 2nd edition, pages 568-580 (1981).

Propylene based polymers can be produced using the process of this invention at various levels of tacticity. Examples of such polymers include atactic polypropylene, isotactic polypropylene, semi-isotactic and syndiotactic polypropylene or mixtures thereof produced by using two or more different catalysts in the practice of this invention. Other propylene polymers include propylene block or impact copolymers. Propylene polymers of these types are well known in the art, see for example U.S. Pat. Nos. 4,794,096; 3,248,455; 4,376,851; 5,036,034 and 5,459,117, all of which are herein incorporated by reference.

K. Polymer Blends

The polymers of the invention may be blended and/or coextruded with any other polymer. Non-limiting examples of other polymers that can be blended with the polypropylene polymer of this invention include linear low density polyethylenes produced via conventional Ziegler-Natta and/or bulky ligand metallocene catalysis, elastomers, plastomers, high pressure low density polyethylene, various high density polyethylenes, various other polypropylenes and the like.

L. Articles

Polymers produced by the process of the invention and blends thereof are useful in producing any variety of articles. For example, the polymers are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

In another embodiment, the polymer of the invention is made into a film by methods known in the art. For film applications, the polymers of the invention have an $I_{21}$ value of from about 2 to about 100 dg/min, preferably from about 2 to about 50 dg/min, and more preferably from about 2 to about 30 dg/min. $I_{21}$ is measured by ASTM Method D 1238.

In another embodiment, the polymer of the invention is made into a molded article by methods known in the art, for example, by blow molding and injection-stretch molding. For molded applications, the polymers of the invention have a $I_{21}$ of from about 20 dg/min to about 50 dg/min and preferably from about 35 dg/min to about 45 dg/min.

In another embodiment, the polymer of the invention is made into a pipe by methods known in the art. For pipe applications, the polymers of the invention have a $I_{12}$, of from about 2 to about 10 dg/min and preferably from about 2 to about 8 dg/min. In another embodiment, the pipe of the invention satisfies ISO qualifications. In another embodiment, the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

In another embodiment, the polymer has an extrusion rate of greater than about 17 lbs/hour/inch of die circumference and preferably greater than about 20 lbs/hour/inch of die circumference and more preferably greater than about 22 lbs/hour/inch of die circumference.

The objects produced (such as films, pipes, etc.) may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

These polymer products are also characterized as having at least 10 ppm of residual fluorine present, preferably between 10 and 10,000 ppm of fluorine present, preferably between 10 and 1000 ppm.

VII. EXAMPLES

Test Methods

Mw and Mn were measured by GPC (Gel Permeation Chromatography) using a differential refractive index (DRI) detector. This method uses a Waters 150C C GPC gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 0.5 mL/min. Three (Polymer Laboratories) PLgel Mixed-B columns were used. This technique is discussed in "*Macromolecules*", Vol. 34, No. 19, pp. 6812-6820, which is incorporated herein by reference.

The separation efficiency of the column set was calibrated using a series of narrow MWD polystyrene standards, which reflects the expected MW range for samples and the exclusion limits of the column set. At least 10 individual polystyrene standards, ranging from Mp ~580 to 10,000,000, were used to generate the calibration curve. The polystyrene standards are obtained from Polymer Laboratories (Amherst, Mass.) or an equivalent source. To assure internal consistency, the flow rate is corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (logMp vs. retention volume) is generated by recording the retention volume at the peak in the DRI signal for each PS standard, and fitting this data set to a 2nd-order polynomial. Polystyrene standards were graphed using Viscotec 3.0 software. Samples were analyzed using WaveMetrics, Inc. IGOR Pro and Viscotec 3.0 software using updated calibration constants.

Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute, called first melt. The sample was kept at about 200° C. for 5 minutes before a second cooling-heating cycle was applied. During the second cycle, the sample was cooled from 200° C. to −50° C. at a rate of 10° C./minute, call second cool, and then kept at −50° C. for 5 minutes and heated to 200° C. at a rate of 10° C./minute, called second melt. All the thermal events in both the first and second cycle were recorded. The melting temperature (Tm) was the peak temperature of a melting curve and the crystallization temperature (Tc) was the peak temperature of a cooling curve. Tm, Tc and heat of fusion were obtained from the thermal events in the second cooling-heating cycle unless otherwise noted. Areas under the melting curves were measured and used to determine the heat of fusion and the degree of crystallinity. The percent of crystallinity was calculated using the formula, [area under the curve (Joules/gram)/B (Joules/gram)] * 100, where B is the heat of fusion for the homopolymer of the major monomer component. These values for B were obtained from the Polymer Handbook, Fourth Edition, published by John Wiley and Sons, New York, 1999. A value of 189 J/g (B) was used as the heat of fusion for 100% crystalline polypropylene. For polymers displaying multiple melting and/or multiple crystallization peaks in the second cooling-heating cycle, all the peak crystallization temperatures (Tc) and peak melting temperatures (Tm) were reported. For the purpose of this invention and the claims thereto, Tm and Tc referred to were obtained from the primary melting and the primary cooling curve, respectively. The primary melting peak was defined as the melting peak with greatest heat of fusion, the primary cooling peak was defined as the cooling peak with greatest heat of crystallization. The heat of fusion for each melting peak was calculated individually. Crystallinity was calculated using the sum of heat of fusion from all melting peaks in the second cooling-heating cycle.

Ethylene content of the polymers was determined using $^{13}$C nuclear magnetic resonance (NMR). All the peaks in the NMR spectra were referenced by setting the mmmm methyl peak to 21.8 ppm. All secondary carbons are defined by the peak regions in Table A. Naming of the peaks was made in accordance with a method by Carman, et al. in *Rubber Chemistry and Technology*, 44 (1971), p. 781, where e.g., $S_{\alpha\delta}$ denotes a peak area of the $\alpha\delta^+$ secondary carbon peak.

TABLE A

| ppm range | assignment |
| --- | --- |
| 45-48 | $S_{\alpha\alpha}$ |
| 36-39 | $S_{\alpha\delta} + S_{\alpha\gamma}$ |
| 34-36 | $S_{\alpha\beta}$ |
| 30.7 | $S_{\gamma\gamma}$ |
| 30.3 | $S_{\gamma\delta}$ |
| 29.9 | $S_{\delta\delta}$ |
| 27.5-27.7 | $S_{\beta\gamma}$ |
| 27.1-27.3 | $S_{\beta\delta}$ |
| 24.5-25 | $S_{\beta\beta}$ |

All tertiary carbons are defined by the peak regions in Table B. Note that the peak region of 30.7-31 ppm has overlapping peaks of secondary and tertiary carbons.

TABLE B

| ppm range | assignment |
| --- | --- |
| 33.6-34 | $T_{\gamma\gamma}$ |
| 33.4-33.6 | $T_{\gamma\delta}$ |
| 33.2 | $T_{\delta\delta}$ |
| 31-31.4 | $T_{\beta\gamma}$ |
| 30.7-31 | $(T_{\beta\delta} + S_{\gamma\gamma})$ |
| 28-29 | $T_{\beta\beta}$ |

The $T_{\beta\delta}$ and $S_{\gamma\gamma}$ peaks are overlapping. The area of $S_{\gamma\gamma}$ peak can be calculated as:

$$S_{\gamma\gamma}=(S_{\beta\delta}-S_{\gamma\delta})/2 \quad (A)$$

In Table A, the area of $S_{\gamma\gamma}$ peak was calculated by equation A, rather than by direct integration. Total area of secondary carbons (S) was calculated by the sum of all areas in Table A.

Total area of tertiary carbons (T) was calculated by the sum of all areas in Table B subtracted by the area of $S_{\gamma\gamma}$ peak, as calculated by equation (A).

Total area of primary carbons (P) is the total area between 19 and 23 ppm.

Ethylene content, in weight %, was calculated by $$E \text{ weight \%} = (S-T/2-P/2)/(S+T+P) \tag{B}$$

Examples 1-7

Examples 1-7 were performed in a 0.5-liter autoclave reactor equipped with a stirrer, an external water/steam jacket for temperature control, a regulated supply of dry nitrogen, propylene, ethylene, and a septum inlet for introduction of other solvents, catalysts and scavenger solutions. The polymerization was conducted in a semi-batch mode with continuous ethylene feed. The reactor was dried and degassed thoroughly prior to use. Diluent and monomer were purified by passing through a 1-liter basic alumina column activated at 600° C., followed by a column of 3A molecular sieves activated at 600° C. or Selexsorb CD prior to transferring into the reactor. Triethyl aluminum solution (TEAL) (1 mol % in hexane) and cyclohexylmethyl dimethoxysilane solution (CMMS) (0.1 mol % in hexane) were first added into the reactor. Then fluorocarbon and propylene were added into the reactor, followed by the addition of catalyst-oil slurry, each step being conducted at room temperature. The mixture was then immediately stirred and heated rapidly to a desired polymerization temperature. Ethylene was then added to the reactor when propylene random compolymer was made. The amount of ethylene addition was controlled to maintain the differential pressure in excess of combined vapor pressure of the propylene and solvent by setting the inlet pressure of ethylene feed line at a desired level higher than the registered reactor pressure prior to ethylene addition. The polymerization was conducted for 60 minutes at 70° C. Thereafter, the reactor was cooled down and unreacted propylene and diluent were vented to the atmosphere. The resulting mixture, containing mostly diluent, polymer and unreacted monomers, was collected in a collection box and first air-dried in a hood to evaporate most of the diluent, and then dried in a vacuum oven at a temperature of about 90° C. for about 12 hours.

The catalyst was a Ziegler-Natta type of catalyst, which was comprised of $TiCl_4$ supported on $MgCl_2$. The catalyst was suspended in oil at a concentration of 5 weight % catalyst. HFC-236fa, 1,1,1,3,3,3-hexafluoropropane, was obtained from Dupont (SUVA-236fa). HFC-245fa, 1,1,1,3,3-pentafluoropropane, was obtained from Honeywell (Enovate 3000). All of the polymers produced in Examples 1-7 were in discrete granular form. By discrete granular form is meant that there was no granule agglomeration and each granule act individually in the polymerization medium. The polymer granules formed are not soluble or swellable to any significant extent in the polymerization media. The results are shown in Table 1.

TABLE 1

| Process Condition/<br>Product Characteristic | Ex 1 | Ex 2 | Ex 3 | Ex 4 | Ex 5 | Ex 6 | Ex 7 |
| --- | --- | --- | --- | --- | --- | --- | --- |
| Catalyst (mg) | 5.95 | 5.7 | 5.7 | 6.1 | 5.75 | 5.75 | 6.05 |
| Diluent | SUVA-236fa | SUVA-236fa | SUVA-236fa | SUVA-236fa | SUVA-236fa | SUVA-236fa | HFC-245fa |
| Diluent (ml) | 125 | 125 | 125 | 125 | 125 | 125 | 125 |
| Propylene (ml) | 50 | 50 | 50 | 50 | 50 | 50 | 50 |
| Ethylene (psid) | 105 | 25 | 45 | 65 | 85 | 125 | 100 |
| Yield (g) | 8.7 | 12.5 | 15.5 | 13.7 | 9.2 | 8.5 | 31.7 |
| Productivity (kg poly/g cat/Hr) | 1.5 | 2.2 | 2.7 | 2.2 | 1.6 | 1.5 | 5.2 |
| Mn (kg/mol) | 126.5 | 104.3 | 100.5 | 95.2 | 111.9 | 162.3 | *** |
| Mw (kg/mol) | 1022.4 | 664.1 | 811.3 | 839.4 | 903.6 | 1153.3 | *** |
| Mz (kg/mol) | 3066.5 | 2193.0 | 2805.4 | 2840.6 | 2808.7 | 3101.3 | *** |
| MWD (Mw/Mn) | 8.1 | 6.4 | 8.1 | 8.8 | 8.1 | 7.1 | *** |
| Ethylene content (weight %) | 55.8 | 28.5 | 44.3 | 49.2 | 78.3 | 64.1 | *** |
| Primary melting peak and cooling peak | | | | | | | |
| Tc (° C.) | 99.7 | 91.5 | 95.3 | 96.1 | 99.0 | 101.5 | 102.0 |
| Tm (° C.) | 118.5 | 108.6 | 117.0 | 117.3 | 118.3 | 119.1 | 118.7 |
| Tg (° C.) | *** | *** | *** | *** | *** | *** | −15.1 |
| Heat of fusion (J/g) | 23.7 | 7.3 | 15.3 | 18.9 | 23.3 | 29.4 | 23.4 |
| Secondary melting peak | | | | | | | |
| Tm (° C.) | na | 158.7 | 162.4 | 162.5 | na | na | na |
| Heat of fusion (J/g) | na | 3.3 | 2.9 | 2.7 | na | na | na |
| Crystallinity (%) | 12.5 | 5.6 | 9.6 | 11.4 | 12.3 | 15.6 | 12.4 |

***Data not available at the time of filing, na: no secondary melting peak and cooling peak exist The data of Table 1 show that polypropylene copolymers made using fluorinated hydrocarbon as a diluent were formed as discrete particles, with little to no loss in productivity. Examples 3 to 4 have two melting peaks displayed in the DSC trace of the second melt. The primary melting peak was defined at the peak with greater value of heat of fusion, while the heat of fusion for the secondary melting is less.

Examples 8-11

Propylene/ethylene polymerization was performed using HFC-245fa as diluent and a Ziegler-Natta catalyst. The catalyst was comprised of TiCl4 supported on $MgCl_2$. The catalyst was suspended in oil at a concentration of 5 weight % of catalyst for easy handling. The ethylene pressure was a differential pressure in excess of combined vapor pressure of propylene and solvents at the polymerization temperature.

The polymerization process was carried out in a 2.0-liter autoclave reactor equipped with a stirrer, an external water/steam jacket for temperature control, a regulated supply of dry nitrogen, ethylene, propylene, and a septum inlet for introduction of other solvents, catalysts and scavenger solutions. The reactor was dried and degassed thoroughly prior to use. All solvents and monomers were purified by passing through a series of columns consisting of molecular sieves (3A and 13X) activated at 600° C. and Selexsorb CD prior to transferring into the reactor. 2.0 mL triethyl aluminum solution (TEAL) (1 mol % in hexane) and 2.0 mL cyclohexylmethyl dimethoxysilane solution (CMMS) (0.1 mol % in hexane) were first added into the reactor. Approximately 5.6 mmol hydrogen was then introduced. Fluorocarbon and propylene were subsequently added to the reactor. All of these additions were conducted at room temperature. The reactor was then heated to about 70° C. under stirring and allowed to equilibrate. Ethylene was then added in amounts to achieve specific ethylene partial pressures. The reaction was initiated by the addition of the catalyst-oil slurry with 250 mL of propylene, and the polymerization reaction was conducted in batch mode at 70° C.

Examples 10 and 11 are examples of prepolymerization. At a temperature of approximately 30° C., 2.0 mL of 1M TEAl in n-hexane solution and 2 mL of 0.1 M (MCMS) were first added to the autoclave reactor. Approximately 5.6 mmol $H_2$ was next added, followed by 500 mL of propylene and 500 mL of HFC-245fa. The reaction was initiated by the addition of catalyst with 250 mL of propylene at about 30° C. The reactor was then heated to 70° C. and allowed to equilibrate. Ethylene was then charged to the reactor in amounts to achieve specific partial pressures, and was then continually added into the reactor in semi-batch mode during the reaction to maintain the differential pressure in the excess of combined vapor pressure of the propylene and solvent.

The detailed polymerization conditions are listed in Table 2. The approximate percent, by visual examination, of these polymers produced in these examples that existed in discrete granular form is also included. By discrete granular form is meant that there was no granule agglomeration present and each granule acted individually in the polymerization medium. No fouling was observed in the reactor. Examples 8 to 11 showed a single melting peak and a single cooling peak in the second cooling-heating cycle. The cooling peak for examples 10 and 11 was bimodal.

TABLE 2

| Process Condition/<br>Product Characteristic | Ex 8 | Ex 9<br>Ex 9 | Ex 10<br>Ex 10 | Ex 11<br>Ex 11 |
| --- | --- | --- | --- | --- |
| Catalyst (mg) | 10.3 | 11.3 | 11.7 | 9.8 |
| HFC-245fa (ml) | 500 | 500 | 500 | 500 |
| Propylene (ml) | 750 | 750 | 750 | 750 |
| Ethylene (psid) | 15 | 25 | 25 | 20 |
| $H_2$ (mmole) | 5.6 | 5.6 | 5.6 | 5.6 |
| Reaction time (min) | 61 | 61 | 37 | 64 |
| Yield (g) | 61.5 | 47.5 | 411.4 | 231.4 |
| Productivity (kg poly/g cat/Hr) | 5.9 | 4.1 | 35.7 | 23.6 |
| Mn (kg/mol) | 91.9 | 124.1 | 122.1 | 137.1 |
| Mw (kg/mol) | 377.6 | 452.2 | 448.1 | 499.0 |
| Mz (kg/mol) | 951.6 | 1140.0 | 1144.5 | 1243.2 |
| MWD (Mw/Mn) | 4.11 | 3.64 | 3.67 | 3.64 |
| Ethylene (weight %) | 7.0 | 13.0 | 23.6 | 19.2 |
| Tc (° C.) | 82.2 | 71.4 | 84.8 | 86.8 |
| Tm (° C.) | 132 | 115.5 | 162.2 | 161.8 |
| Heat of fusion (J/g) | 55 | 40.4 | 7.2 | 6.8 |
| Crystallinity (%) | 29.1 | 21.4 | 3.8 | 3.6 |
| Approximate discrete granule (%) by visual examination | 10 | <1 | >95 | >95 |

Having now fully described this invention, it will be appreciated by those skilled in the art that the invention can be performed within a wide range of parameters within what is claimed, without departing from the spirit and scope of the invention.

All documents described or listed herein are incorporated by reference, including any priority documents and/or testing procedures, to the extent that they are not inconsistent with the disclosure.

We claim:

1. A process for producing an elastomeric polypropylene copolymer, comprising:
mixing together a diluent containing more than 10 weight percent of a fluorinated hydrocarbon based on the total weight of the diluent, a supported Ziegler-Natta catalyst system, and an olefin feed containing at least 25 weight % propylene and greater than 10 weight % ethylene, based on total weight of the feed, to provide a slurry; and
forming an elastomeric polypropylene copolymer having a melting point of greater than or equal to 10° C., and wherein the diluent comprises a mixture of at least one saturated hydrocarbon and at least one fluorinated hydrocarbon wherein the mixture has a density in the range of from 0.2 g/cc less than to 0.2 g/cc greater than the density of the polymer.

2. The process of claim 1, wherein the diluent contains greater than 5 volume percent of a fluorinated hydrocarbon based on the total volume of the diluent.

3. The process of claim 1, wherein the fluorinated hydrocarbon is represented by the formula: $C_xH_yF_z$, wherein x is an integer from 1 to 40, wherein y is greater than or equal to 0 and z is an integer and at least one.

4. The process of claim 2, wherein the fluorinated hydrocarbon is a perfluorinated hydrocarbon.

5. The process of claim 3, wherein x is from 1 to 6, and y and z are integers and at least one.

6. The process of claim 1, wherein the diluent further comprises at least one $C_1$ to $C_{40}$ alkane.

7. The process of claim 1, wherein the diluent comprises a mixture of at least one saturated hydrocarbon and at least one fluorinated hydrocarbon wherein the mixture has a density in the range of from 0.1 g/cc less than to 0.1 g/cc greater than the density of the polymer.

8. The process of claim 7, wherein the diluent comprises a mixture of at least one saturated hydrocarbon and at least one fluorinated hydrocarbon wherein the mixture has a density in the range of from 0.5 g/cc less than to 0.5 g/cc greater than the density of the polymer.

9. The process of claim 1, wherein the olefin feed contains less than 90 weight % propylene, based on total weight of the olefin feed.

10. The process of claim 9, wherein the olefin feed contains from 25 weight % to less than 90 weight % propylene, based on total weight of the olefin feed.

11. The process of claim 1, wherein the olefin feed contains less than 75 weight % ethylene, based on total weight of the olefin feed.

12. The process of claim 11, wherein the olefin feed contains less than 60 weight % ethylene, based on total weight of the olefin feed.

13. The process of claim 1, wherein the olefin feed contains at least 20 weight % ethylene, based on total weight of the olefin feed.

14. The process of claim 1, wherein the olefin feed contains from 15 weight % to 60 weight % ethylene, based on total weight of the olefin feed.

15. The process of claim 1, wherein the olefin feed further contains one or more comonomers having olefinic unsaturation and are capable of insertion polymerization.

16. The process of claim 1, wherein the olefin feed further contains one or more comonomers selected from linear, branched, or ring-containing olefins having up to 30 carbon atoms, and combinations thereof.

17. The process of claim 1, wherein the olefin feed further contains one or more comonomers selected from linear or branched $C_4$ to $C_{20}$ alpha olefins.

18. The process of claim 1, wherein the olefin feed further contains one or more comonomers selected from linear $C_4$ to $C_8$ alpha olefins.

19. The process of claim 1, wherein the supported Ziegler-Natta catalyst system contains one or more alkali earth or alkali metal compounds.

20. The process of claim 1, wherein the supported Ziegler-Natta catalyst comprises talc, inorganic oxides, or resinous support materials.

21. The process of claim 1, wherein the supported Ziegler-Natta catalyst comprises silica, alumina, silica-alumina, magnesia, titania, zirconia, or mixtures thereof.

22. The process of claim 1, wherein the process is carried out in a loop reactor.

23. The process of claim 1, wherein the process is carried out in a stirred tank reactor.

24. The process of claim 22, further comprising continuously discharging at least a portion of the slurry from the reactor as polymerization effluent.

25. The process of claim 24, further comprising flashing the polymerization effluent in a first flash to vaporize from about 50% to about 100% of liquid in the effluent to produce concentrated polymer effluent and vaporized liquid.

26. The process of claim 25, further comprising condensing the vaporized liquid obtained in the first flash without compression.

27. The process of claim 25, further comprising discharging from the first flash polymer solids to a second flash through a seal chamber of sufficient dimension such as to maintain a volume of polymer solids/slurry in the seal chamber sufficient to maintain a pressure seal.

28. The process of claim 1, wherein the polymerization is carried out at a temperature of less than 100° C.

29. The process of claim 1, wherein the polymerization is carried out at a temperature of greater than 30° C.

30. The process of claim 1, wherein the propylene is prepolymerized prior to polymerizing with the ethylene.

31. The process of claim 1, wherein the propylene and ethylene are prepolymerized.

32. The process of claim 1, wherein the polymerization is carried out at a pressure of from 5 bar to 50 bar.

33. The process of claim 1 further comprising recovering the elastomeric polypropylene copolymer from the slurry.

34. A process for producing copolymer comprising:
mixing together a diluent containing at least one fluorinated hydrocarbon, a supported Ziegler-Natta catalyst system, and an olefin feed containing at least 25 weight % propylene and greater than 10 weight % ethylene, based on total weight of the feed, to form a slurry containing copolymer; and
recovering the copolymer from the slurry, wherein the copolymer has a melting point of greater than or equal to 10° C., and wherein the diluent comprises a mixture of at least one saturated hydrocarbon and at least one fluorinated hydrocarbon wherein the mixture has a density in the range of from 0.2 g/cc less than to 0.2 g/cc greater than the density of the polymer.

35. The process of claim 34, wherein the olefin feed further contains at least one comonomer selected from $C_4$ to $C_{20}$ linear, branched or cyclic monomers, and mixtures thereof.

36. The process of claim 34, wherein the olefin feed further contains at least one comonomer selected from $C_4$ to $C_{12}$ linear, branched or cyclic monomers, and mixtures thereof.

37. The process of claim 34, wherein the supported Ziegler-Natta catalyst comprises talc, inorganic oxides, or resinous support materials.

38. The process of claim 34, wherein the supported Ziegler-Natta catalyst comprises silica, alumina, silica-alumina, magnesia, titania, zirconia, or mixtures thereof.

39. The process of claim 34, wherein the fluorinated hydrocarbon is represented by the formula: $C_xH_yF_z$, wherein x is an integer from 1 to 40, wherein y is greater than or equal to 0 and z is an integer and at least one.

40. The process of claim 34, wherein the diluent further comprises at least one $C_1$ to $C_{40}$ alkane.

41. The process of claim 34, wherein the diluent comprises a mixture of at least one saturated hydrocarbon and at least one fluorinated hydrocarbon wherein the mixture has a density in the range of from 0.1 g/cc less than to 0.1 g/cc greater than the density of the polymer.

42. The process of claim 34, wherein the olefin feed contains less than 90 weight % propylene, based on total weight of the olefin feed.

43. The process of claim 34, wherein the olefin feed further contains one or more comonomers selected from linear or branched $C_4$ to $C_{20}$ alpha olefins.

44. The process of claim 34, wherein the supported Ziegler-Natta catalyst system contains one or more alkali earth or alkali metal compounds.

45. The process of claim 34, wherein the process is carried out in a loop reactor or in a stirred tank.

46. The process of claim 45, further comprising continuously discharging at least a portion of the slurry from the reactor as polymerization effluent.

47. The process of claim 46, further comprising flashing the polymerization effluent in a first flash to vaporize from about 50% to about 100% of liquid in the effluent to produce concentrated polymer effluent and vaporized liquid.

48. The process of claim 47, further comprising condensing the vaporized liquid obtained in the first flash without compression.

49. The process of claim 46, further comprising discharging from a first flash polymer solids to a second flash through a seal chamber of sufficient dimension such as to maintain a volume of polymer solids/slurry in the seal chamber sufficient to maintain a pressure seal.

50. The process of claim 34, wherein the polymerization is carried out at a temperature of less than 100° C.

51. The process of claim 34, wherein the propylene is prepolymerized prior to polymerizing with the ethylene.

52. The process of claim 34, wherein the polymerization is carried out at a pressure of from 5 bar to 50 bar.

* * * * *